US005813301A

United States Patent [19]

Fujita

[11] Patent Number: 5,813,301

[45] Date of Patent: *Sep. 29, 1998

[54] PUNCHING TOOL

[75] Inventor: Oriya Fujita, Kanagawa-ken, Japan

[73] Assignee: Amada Metrecs Company, Limited, Kanagawa, Japan

[ * ] Notice: The term of this patent shall not extend beyond the expiration date of Pat. No. 5,445,057.

[21] Appl. No.: 833,772

[22] Filed: Apr. 9, 1997

Related U.S. Application Data

[63] Continuation of Ser. No. 443,423, May 18, 1995, abandoned, which is a continuation-in-part of Ser. No. 189,604, Feb. 1, 1994, Pat. No. 5,445,057.

[30] Foreign Application Priority Data

| | | | |
|---|---|---|---|
| Feb. 3, 1993 | [JP] | Japan | 5-16188 |
| May 27, 1994 | [JP] | Japan | 6-115083 |

[51] Int. Cl.[6] .............................. B26F 1/14; B21D 45/08; F16F 9/02

[52] U.S. Cl. .............................. 83/140; 83/588; 83/686

[58] Field of Search .............................. 83/137, 138, 139, 83/140, 142, 143, 588, 635, 684, 685, 686

[56] References Cited

U.S. PATENT DOCUMENTS

| | | | |
|---|---|---|---|
| 2,867,276 | 1/1959 | Taylor . | |
| 2,983,176 | 5/1961 | Taylor . | |
| 3,211,035 | 10/1965 | Whistler, Sr. et al. . | |
| 3,461,762 | 8/1969 | Deni et al. . | |
| 3,622,067 | 11/1971 | Bucy et al. . | |
| 3,683,735 | 8/1972 | Achler et al. . | |
| 3,741,056 | 6/1973 | Saladin . | |
| 3,765,285 | 10/1973 | Achler et al. . | |
| 3,815,459 | 6/1974 | Daniels . | |
| 4,280,383 | 7/1981 | Bryan et al. . | |
| 4,316,399 | 2/1982 | Wallis | 83/137 |
| 4,341,137 | 7/1982 | Leitch et al. . | |
| 4,457,196 | 7/1984 | Cady . | |
| 4,524,660 | 6/1985 | Yonezawa | 83/137 |
| 4,631,996 | 12/1986 | Magnuson | 83/137 |
| 4,843,931 | 7/1989 | Whister . | |
| 4,856,393 | 8/1989 | Braddon . | |
| 4,862,782 | 9/1989 | Ernst . | |
| 4,977,804 | 12/1990 | Naito | 83/76.7 |

(List continued on next page.)

FOREIGN PATENT DOCUMENTS

| | | |
|---|---|---|
| 0000762 | 2/1979 | European Pat. Off. . |
| 0532147 | 3/1993 | European Pat. Off. . |
| 0611188 | 8/1994 | European Pat. Off. . |
| 0622135 | 11/1994 | European Pat. Off. . |
| 2132515 | 11/1972 | France . |
| 2637085 | 2/1978 | Germany . |
| 2921098 | 7/1980 | Germany . |
| 3-4318 | 1/1991 | Japan . |

OTHER PUBLICATIONS

Tooling & Production, Federico Strasser, vol. 50, No. 7, Oct. 1984, pp. 74–75, Solon Ohio.

*Primary Examiner*—Rinaldi I. Rada
*Assistant Examiner*—Clark F. Dexter
*Attorney, Agent, or Firm*—Greenblum & Bernstein P.L.C.

[57] ABSTRACT

A punching tool for a press, includes a punch guide having a stripper plate at a lower end thereof. A punch body is formed with a blade portion at a lower end thereof and disposed within the punch guide for up and down movement. A punch driver includes a piston rod fixed to the punch body. A gas spring section has a gas cylinder, the piston rod of the punch driver extending through the gas cylinder for up and down movement. A high pressure gas is contained in the gas cylinder to bias the punch driver upward, and an annular elastic member is interposed between an upper surface of the punch guide and a lower surface of the gas cylinder of the gas spring section to absorb shock generated when the stripper plate attached to the punch guide collides against work during a punching process. The punching tool can reduce noise generated during punching processing and further can prevent a punching mark (scar) from being formed on the surface of the punched work.

6 Claims, 2 Drawing Sheets

U.S. PATENT DOCUMENTS

| | | | |
|---|---|---|---|
| 4,989,484 | 2/1991 | Johnson et al. | 83/140 |
| 5,042,352 | 8/1991 | Lux . | |
| 5,081,891 | 1/1992 | Johnson et al. | 83/140 |
| 5,131,303 | 7/1992 | Wilson et al. | 83/140 |
| 5,176,057 | 1/1993 | Chun et al. . | |
| 5,390,575 | 2/1995 | Saito | 83/140 |
| 5,410,927 | 5/1995 | Omata et al. . | |
| 5,419,225 | 5/1995 | Fujita | 84/140 |
| 5,445,057 | 8/1995 | Fujita | 83/140 |
| 5,553,524 | 9/1996 | Fujita | 83/137 |
| 5,613,416 | 3/1997 | Fujita | 83/140 X |

PUNCHING TOOL

CROSS REFERENCE TO RELATED APPLICATIONS

This application is a continuation of application Ser. No. 08/443,423, filed May 18, 1995, now abandoned, which is a continuation-in-part of application Ser. No. 08/189,604, filed Feb. 1, 1994, now U.S. Pat. No. 5,445,057, which applications are expressly incorporated by reference in their entirety.

BACKGROUND OF THE INVENTION

1. Technical field

The present invention relates to a punching tool, and more specifically to a punching tool for a press, which can reduce noise generated during punching processing and further which can prevent a mark (scar) from being formed on a surface of work due to punching pressure.

2. Background Art

Conventionally, in a press machine or a punching press, plate-shaped work mounted on a lower tool (die) is punched out by use of an upper tool (punch) in cooperation with the lower tool (die). In this punching processing, since the punch is pushed against the die by a large punching force, violent noise is inevitably generated. One of the noise sources of the punching processing is punching sound generated due to an instantaneous collision of the punch or a punch guide (some of which comprises a stripper plate on the lower end thereof) against the work.

Further, in general, the punching tool is usually provided with a strong spring (referred to as a stripper spring, usually) for extracting the punch from the work.

As the stripper spring, a compression spring such as a coil spring, a coned disk spring or urethane spring, etc. are used. Here, however, when an extraordinary force is required to extract the punch from work, a coned disk spring is often used, because a large elastic force can be obtained at a small stroke.

In the conventional punching tool for forming a relatively large diameter hole in the work, since a relatively large punching force is required and thereby the stripping force also increases usually in proportion to the punching force, a coned disk spring for generating a large stripping force has been so far often used as the stripper spring. In the case of the coned disk spring, however, when used for many hours or when used to punch a thick plate, since the coned disk spring is largely deformed, there exists a problem in that the coned disk spring is easily deformed permanently due to fatigue or damage. In addition, since a large mounting load stored in the cone disk spring is applied to the work momentarily as a shock, there arises another problem in that a mark (i.e., scar) is easily formed on a surface of work whenever the work is punched out.

SUMMARY OF THE INVENTION

With these problems in mind, therefore, it is the object of the present invention to provide a punching tool, which can reduce noise generated during punching processing and further can prevent a punching mark (scar) from being formed on the surface of the punched work.

To achieve the above-mentioned object, the present invention provides a punching tool for a press, comprising: a punch guide (19); a punch body (25) formed with a blade portion (27) at a lower end thereof and disposed within said punch guide movably up and down; a punch driver (37) having a piston rod (43) formed integral with said punch body (25) and fixed to said punch body; a gas spring section (15) having a gas cylinder (45), the piston rod of said punch driver (37) being passed through the gas cylinder movably up and down, and a high pressure gas being contained in the gas cylinder to bias said punch body (25) and said punch driver (37) upward; and an elastic member (61) interposed between an upper surface of said punch guide (19) and a lower surface of the gas cylinder (45) of said gas spring section (15) to absorb shock generated when work (W) is punched out by the punching tool.

Here, the punching tool further comprises an elastic member holder (57) attached to the lower surface of the gas cylinder (45) of said gas spring section (15), for accommodating said elastic member (61), a deformation space (C) of said elastic member (61) being formed between a lower end surface of said elastic member holder (57) and the upper surface of said punch guide (19).

Further, a mounting load (i.e., an initial spring force) of said elastic member (61) is determined to be sufficiently smaller than that of said gas spring section (15) to such an extent as to be negligible; and a spring constant of said elastic member is so determined that an elastic force of said elastic member becomes roughly equal to the mounting load of said gas spring section (15) after having been deformed by the deformation space C.

Further, said elastic member holder (57) is a reverse U-shaped cross section annular elastic member holder.

Further, an outer diameter of the gas cylinder (45) of said gas spring section (15) is determined to be roughly equal to an outer diameter of said punch guide (19).

Further, the piston rod of said punch driver (37) is formed with a large diameter portion (41) projecting upward from an upper surface of the gas cylinder (45) of said gas spring section (15) and with a small diameter portion (43) projecting downward from a lower surface of the gas cylinder (45) thereof, a punch head (77) being attached to an upper surface of the large diameter portion (41), and said punch body (25) being fixed to a lower surface of the small diameter portion (43) via a punch key holder (55).

In the punching tool according to the present invention, since the elastic member (shock absorber) is interposed between the upper surface of the punch guide and the lower surface of the gas cylinder of the gas spring section, it is possible to absorb shock generated when work is punched out and further to prevent a mark (a scar) from being formed on the surface of the punched work.

Further, since the reverse U-shaped cross section annular elastic member holder is attached to the lower surface of the gas cylinder to accommodate the elastic member (shock absorber) and further a deformation space C of the elastic member is formed between the lower end surface of the annular elastic member holder and the upper surface of the punch guide, it is possible to restrict the deformation rate of the elastic member within this deformation space C, so that the lifetime of the elastic member can be increased.

Further, since the mounting load of the elastic member is determined to be sufficiently smaller than that of the gas spring section to such an extent as to be negligible and further since the spring constant of the elastic member is so determined that the elastic force of the elastic member becomes roughly equal to the mounting load of the gas spring section after having been deformed by the deformation space C, it is possible to effectively absorb shock generated when an initial load substantially equal to the mounting load of the gas spring section is transferred from the stripper plate to the work, without reducing the load applied to the gas spring section.

Further, since the outer diameter of the gas cylinder of the gas spring section is determined to be roughly equal to an outer diameter of the punch guide, it is possible to construct the punching tool compactly.

Further, since the piston rod of said punch driver is formed with a large diameter portion projecting upward from an upper surface of the gas cylinder of the gas spring section and with a small diameter portion projecting downward from a lower surface of the gas cylinder thereof, whenever the punch driver is struck by the striker to push the large diameter portion piston rod into the gas cylinder, the gas pressure within the gas cylinder is increased, so that the upward urging force applied to the large diameter portion piston rod increases, with the result that it is possible to more securely strip the blade portion of the punch body from the punched work.

DETAILED DESCRIPTION OF THE EMBODIMENTS

An embodiment of the punching tool according to the present invention will be described hereinbelow with reference to the attached drawings.

Figure 1:
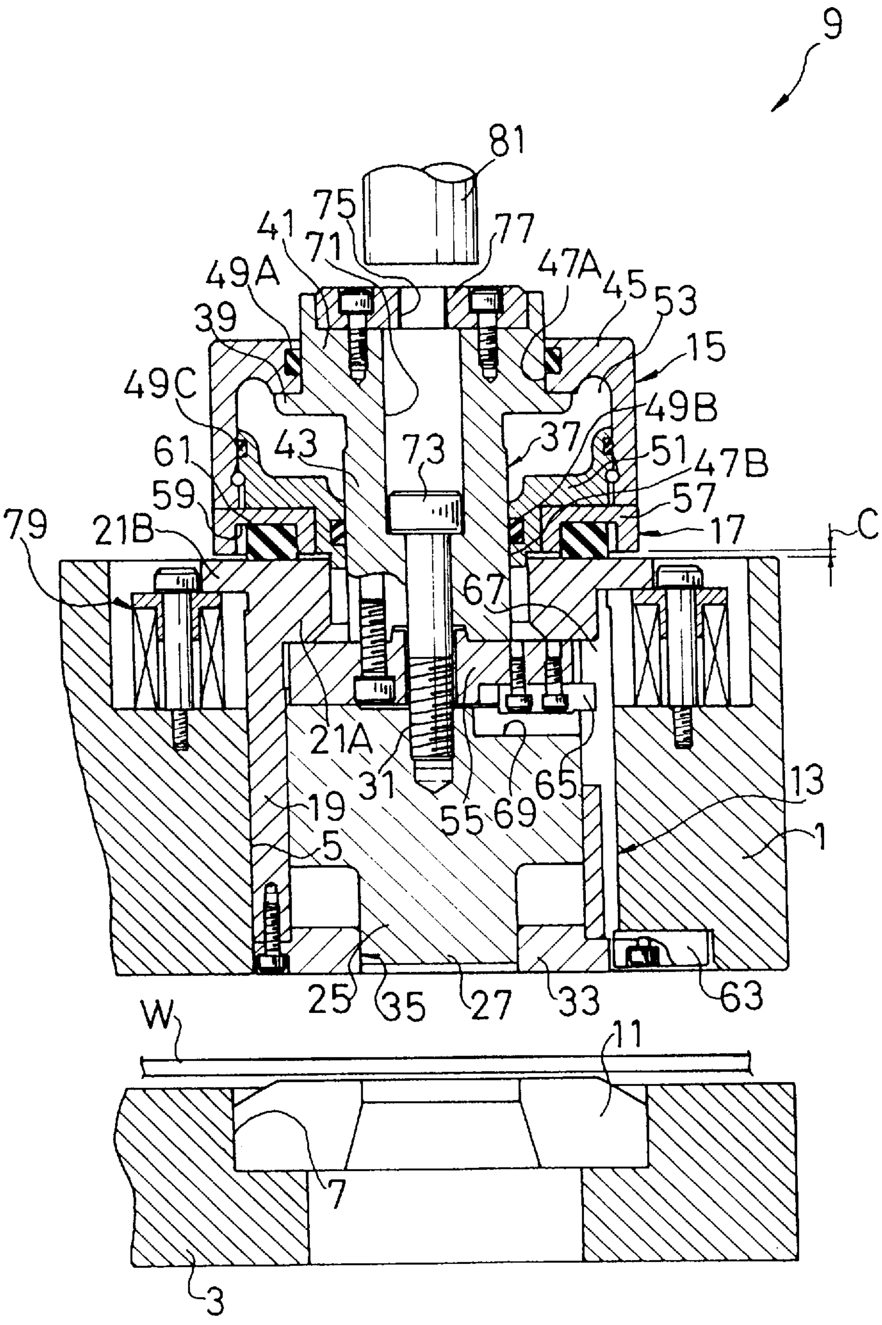
FIG. 1 is a cross-sectional view showing an embodiment of the punching tool according to the present invention, in which the punching tool is mounted on a turret punch press, by way of example.

With reference to FIG. 1, an upper tool (punching tool) 9 according to the present invention is fitted to an upper tool supporting hole 5 of an upper turret 1 of a turret punch press (one example of punch press machine) (not shown), and a lower tool (die) 11 is also fitted to a lower die supporting hole 7 of a lower turret 3 of the same turret punch press.

The punching tool (the upper tool) 9 comprises a punch section 13 composed of a punch guide 19, a punch body 25, a punch driver 37; a gas spring section 15 composed of a gas cylinder 45 and a cylinder end 51, and a shock absorber 17 composed of an annular elastic member holder 57 and an annular elastic member 61.

In more detail, in the punch section 13, the cylindrical punch guide 19 is formed with a pair of flanges, an inner flange 21A and an outer flange 21B, on the upper end portion thereof. Further, on the lower end of the same cylindrical punch guide 19, a stripper plate 33 is attached by use of a plurality of bolts. The stripper plate 33 is formed with an engaging hole 35 into which a punch blade 27 is fitted (described below).

Further, a punch body 25 is fitted into the punch guide 19 so as to be movable up and down. The punch body 25 is formed with a blade portion 27 of an appropriate shape at the lower end surface thereof and with a threaded mounting hole 31 at the upper end surface thereof. The blade portion 27 is engaged with the engaging hole 35 formed in the stripper plate 33 in such a way as to provide an appropriate similar-figure clearance between the blade portion 27 of the punch body 25 and the engaging hole 35 of the stripper plate 33.

Further, the punch driver 37 is fixed to the punch body 25 with a fastening bolt 73 inserted into a central axial hole 71 formed in the punch driver 37 via a punch key holder 55. In more detail, the counter bored hole 71 is formed at an axial portion of the punch driver 37, and the fastening bolt 73 is inserted into the hole 71 to fix the punch driver 37 to the punch body 25. The punch driver 37 serves as a piston rod movable up and down in the gas cylinder 45 and the cylinder end 51. The punch driver 37 is formed with a large diameter piston rod portion 41 on a flange portion 39 thereof and a small diameter piston rod portion 43 below the flange portion 39. Further, the large diameter portion 41 of the punch driver 37 is supported so as to be movable up and down by an upper end guide portion 47A of the gas cylinder 45, and the small diameter portion 43 of the punch driver 37 is also supported so as to be movable up and down by a lower end guide portion 47B of the cylinder end 51 of the gas cylinder 45. In the gas spring section 15, the cylinder end 51 is fixed to the gas cylinder 45 by use of an appropriate fixing means.

A sealing member 49C is interposed between an outer surface of the cylinder end 51 provided in the lower side of the gas cylinder 45 and an inner surface of the gas cylinder 45, to seal the inside of the gas cylinder 45 airtightly. Further, another sealing member 49A is interposed between the upper guide portions 47A of the gas cylinder 45 and the large diameter piston rod 41 of the punch driver 37, and still another sealing member 49B is interposed between the lower guide portions 47B of the cylinder end 51 of the gas cylinder 45 and the small diameter piston rod 43 of the punch driver 37, both to seal the inside of the gas cylinder 45 airtightly.In the gas spring section 15, an inner space 53 of the gas cylinder 45 and the cylinder end 51 is filled with an appropriate gas (e.g., air, nitrogen, etc.) under an appropriate pressure so as to generate an appropriate elastic force as a gas spring. In this embodiment, the inner space 53 is filled with nitrogen gas and pressurized to about 150 kg/cm2.

Further, on the upper end surface of the punch driver 37, a punch head member 77 (a struck portion) formed with a central threaded hole 75 is mounted.

When the punch driver 37 is located at its uppermost position, the small diameter piston rod portion 43 of the punch driver 37 projects downward from the lower guide portion 47B of the cylinder end 51 of the gas cylinder 45 so as to extend to the lower end surface of the inner flange 21A of the punch guide 19. To the lower end surface of the punch driver 37, a disk-shaped punch key holder 55 having a diameter slightly smaller than that of the punch body 25 is attached.

The outer diameter of the gas cylinder 45 is substantially the same as that of outer flange 21B of the punch guide 19. The outer diameter of the guide portion 47B of the cylinder end 51 disposed at the lower end portion of the gas cylinder 45 is smaller than that of the gas cylinder 45, and projects slightly downward from the lower surface of the gas cylinder 45. Further, the lower end portion of the guide portion 47B of the cylinder end 51 is fitted to an upper inner diameter of the punch guide 19 so as to be movable up and down.

The feature of the punching tool according to the present invention is to provide the shock absorber 17 between the punch guide 19 and the cylinder end 51 or the gas cylinder 45, to absorb shock (determined by a high mounting load of the gas spring section 15) generated when the stripper plate 33 collides against the work W. In more detail, an annular elastic member holder 57 having a reverse U-shaped cross section is fitted to the outer circumferential surface of the downward-projecting guide portion 47B of the cylinder end 51. In this annular groove 59 of the reverse U-shaped cross section of the annular elastic member holder 59, the annular elastic member 61 (e.g., a hard rubber having an appropriate hardness) is disposed so as to project downward by a deformation space C. This annular elastic member 61 is mounted under a constant mounting pressure (compression load) between the upper surface of the outer flange 21B of the punch guide 19 and the annular elastic member holder 57.

Therefore, the cylinder end 51 is urged upward and the punch guide 19 is urged downward by an elastic force of the annular elastic member 61. As a result, the punch driver 37 is urged upward via a high pressure gas contained in the inside of the gas cylinder 45, and further the inner flange 21A of the punch guide 19 is to be clamped between the punch key holder 55 and the annular elastic member 61.

Further, the punch guide 19 is formed with a punch guide groove 67 engaged with both a punch guide key 63 fixed to the upper turret 1 and a punch key 65 fixed to the punch key holder 55. Further, the punch body 25 is formed with a punch key groove 69 engaged with the punch key 65.

In the above-mentioned construction, the punch key groove 69 of the punch body 25 is engaged with the punch key 65 fixed to the punch key holder 55, and the punch body 25 is fixed to the punch key holer 55 by fastening the bolt 73 inserted into the central threaded hole 75 of the punch driver 37.

In addition, under the punching tool 9, a lower tool (die) 11 is fixed to a lower turret 3 after the angular position of the die 11 has been decided by use of a key groove and a die key (both not shown). The structure of the die 11 is not described in detail herein, because the die 11 is not directly related to the gist of the present invention.

As described above, after the punch body 25 has been attached to the punch driver 37, the punching tool 9 is fitted to an upper punch supporting hole 5 formed in the upper turret 1. At the same time, the lower tool (die) 11 mated with the punching tool 9 is fitted to the lower tool supporting hole 7 formed in the lower turret 3. Under these conditions, the punching tool is set for a punching process. After that, work W is interposed between the punch 9 and the die 11 in position. When the punch head 77 is struck by a striker 81, the work W can be punched out.

Further, the upper limit position of the punch 9 is determined at a constant height by a lifter spring mechanism 79 disposed in an upper die support hole 5 formed in the turret punch press, so as to be movable up and down relative to the die 11.

In operation of the above-mentioned punching tool 9, when the striker 81 of the punch press is moved downward to strike the punch head member 77 downward, the punch guide 19 is moved downward against the elastic force of the lifter spring mechanism 79 via the high pressure gas contained in the gas cylinder 45 and the annular elastic member 61. When the punch guide 19 is moved downward and thereby the stripper plate 33 disposed at the lower end of the punch guide 19 is brought into contact with the work W, the downward motion of the punch guide 19 is stopped. After that, when the striker 81 is further moved downward, since the annular elastic member 61 is then compressed, the gas cylinder 45, the punch driver 37 and the punch body 25 are further moved together downward relative to the punch guide 19. When these elements 45, 37 and 25 are moved downward by a deformation space C, since the elastic member holder 57 is brought into contact with the upper surface of the punch guide 19, the downward motion of the gas cylinder 45 is stopped.

After that, when the striker 81 is further moved downward to push down the punch driver 37 relative to the gas cylinder 45, since the large diameter portion 41 of the punch driver 37 is pushed into the gas cylinder 45, the high pressure gas contained in the gas cylinder 45 is compressed to a higher gas pressure, so that the punch body 25 punches out the work W against the increased high gas pressure.

Upon the end of the punching of the work W, when the striker 81 is moved upward, the punch driver 37 is moved upward due to the return action of the high pressure gas contained in the gas cylinder 45, so that the blade portion 27 of the punch body 25 is removed from the work W. After that, the annular elastic member 61 is returned to the original state, and further the punch guide 19 is restored upward by the return action of the lifter spring mechanism 79.

Figure 2:
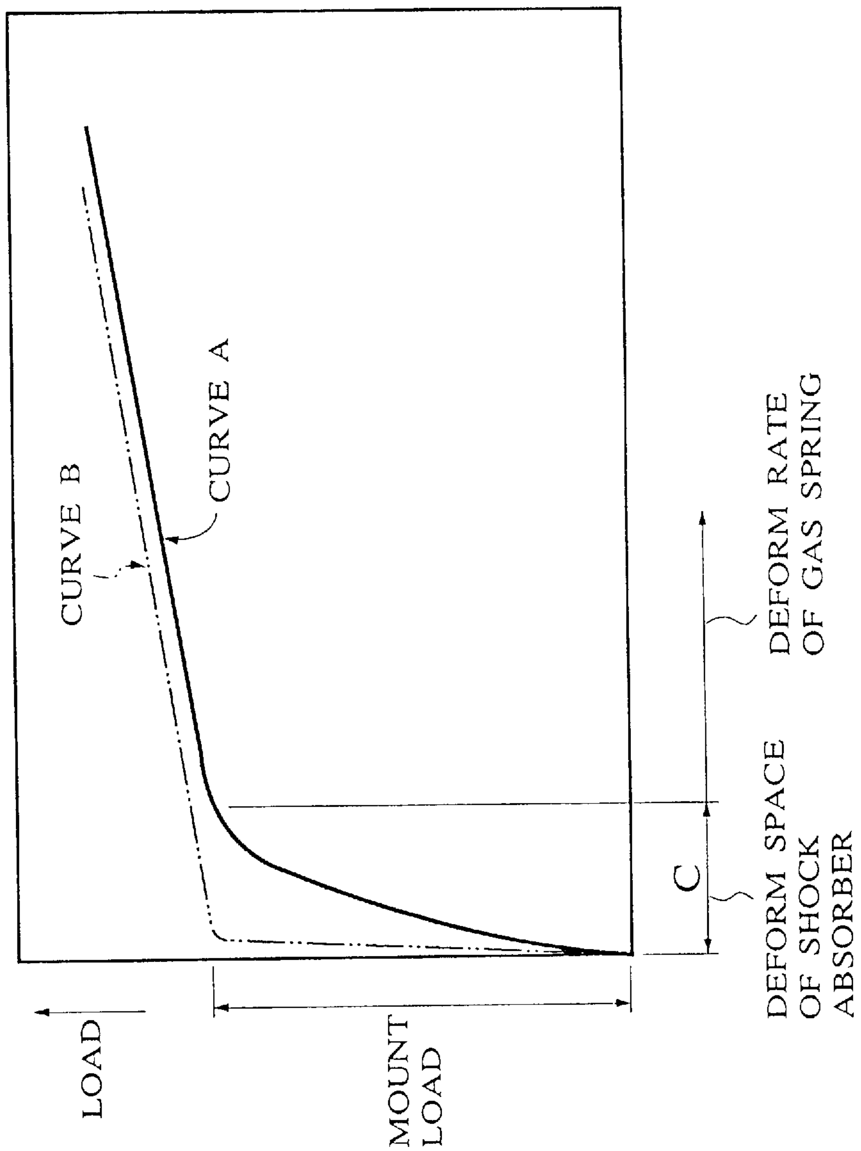
FIG. 2 is a graphical representation showing the relationship between load applied to a stripper plate and the deformation rate of a shock absorber (an elastic member) and a gas spring, which can be obtained when the punching tool according to the present invention is used to punch work (solid curve), in comparison with when the shock absorber is not used (dot-dot-dashed curve).

FIG. 2 shows the variation in load applied to the stripper plate 33 from when the stripper plate 33 is brought into contact with the work W to when blade portion 27 of the punch body 25 is brought into contact with the work W for the punching processing by the above-mentioned punching tool, in which the curve A denotes the case where the shock absorber 17 (i.e., the annular elastic member 61) according to the present invention is disposed and the curve B denotes the case where only the gas spring section 15 is disposed without disposing the shock absorber 17.

FIG. 2 indicates that in the case of the curve B, the mounting initial load, which is substantially equal to the load (about several thousand kg) of the gas spring section 15, is directly transferred from the stripper plate 33 to the work W as an impact. As a result, the noise generated when the stripper plate 33 collides against the work W is large, and thereby a punch mark (scar) is inevitably formed on the surface of the work W by the stripper plate 33.

In the case of the curve A, on the other hand, FIG. 2 indicates the initial load transferred from the stripper plate 33 to the work W can be fairly reduced due to the presence of the shock absorber 17 (i.e., the annular elastic member 61). In this case, the mounting load (i.e., the initial spring force) of the shock absorber 17 is determined to be sufficiently smaller than that of the gas spring section 15 to such an extent as to be negligible (the difference in load between the two curves A and B is small, as shown in FIG. 2). In addition, the spring constant of the shock absorber 17 is so selected as to become roughly equal to the mounting load of the gas spring section 15 after having been deformed by the deformation space C, as shown in FIG. 2.

As a result, in the punching tool according to the present invention, it is possible to reduce the noise generated at collision of the stripper plate 33 against the work W and further to increase the lifetime of the shock absorber 17 (the annular elastic member 61), thus preventing a punch mark (scar) from being formed on the surface of the work W.

Further, the present invention is not limited to only the above-mentioned embodiment and various modifications can be made in the scope not departing from the technical concept of the present invention.

For instance, in the above-mentioned embodiment, although the punch body 25 is fixed to the punch driver 37 by fastening the bolt 73 disposed inside of the punch driver 37, it is possible to fix the punch body 25 to the punch driver 37 by fastening a bolt disposed inside of the punch body 25 (instead of the punch driver 37). In this case, when a plurality of bolts are used, since a rotational force generated when both the members 25 and 37 are fixed to each other is not directly applied to the keys and the key groove, there exists such an effect that the keys 63 and 65 can be kept engaged with the key grooves 67 at high precision.

As described above, in the punching tool according to the present invention, since the annular elastic member (shock absorber) is interposed between-the upper surface of the punch guide and the lower surface of the gas cylinder of the gas spring section, it is possible to absorb shock generated when work is punched out and further to prevent a mark (a scar) from being formed on the surface of the punched work.

Further, since the reverse U-shaped cross section annular elastic member holder is attached to the lower surface of the gas cylinder to accommodate the annular elastic member (shock absorber) and further a deformation space C of the annular elastic member is formed between the lower end surface of the annular elastic member holder and the upper surface of the punch guide, it is possible to restrict the deformation rate of the annular elastic member within this deformation space C, so that the lifetime of the annular elastic member can be increased.

Further, since the mounting load of the annular elastic member is determined to be sufficiently smaller than that of the gas spring section to such an extent as to be negligible and further since a spring constant of the annular elastic member is so determined that an elastic force of the annular elastic member becomes roughly equal to the mounting load of the gas spring section after having been deformed by the deformation space C, it is possible to effectively absorb shock generated when the initial load, which is substantially equal to the mounting load of the gas spring section, is transferred from the stripper plate to the work, without reducing the load applied to the gas spring section.

Further, since the outer diameter of the gas cylinder of the gas spring section is determined to be roughly equal to an outer diameter of the punch guide, it is possible to construct the punching tool compactly.

Further, since the piston rod of said punch driver is formed with a large diameter portion projecting upward from an upper surface of the gas cylinder of the gas spring section and with a small diameter portion projecting downward from a lower surface of the gas cylinder thereof, whenever the punch driver is struck by the striker to push the large diameter portion piston rod into the gas cylinder, the gas pressure within the gas cylinder is increased, so that the upward urging force applied to the large diameter portion piston rod increases, with the result that it is possible to more securely strip the blade portion of the punch body from the punched work.

What is claimed is:

1. A punching tool for a press, comprising:

a punch guide;

a punch body formed with a blade portion at a lower end thereof and movably disposed within said punch guide for up and down movement, and means for movably supporting the punch guide, wherein said punch guide is movable with said punch body and movable with respect to said punch body;

a punch driver having a piston rod portion, said punch driver being fixed to said punch body;

a gas spring section having a gas cylinder, the piston rod portion of said punch driver extending through the gas cylinder for up and down movement, and a high pressure gas being contained in the gas cylinder to bias said piston rod portion, and thereby said punch body and said punch driver, in an upward direction; and an elastic member interposed between an upper surface of said punch guide and a lower surface of the gas cylinder of said gas spring section to absorb shock generated when a work is punched out by the punching tool.

2. The punching tool of claim 1, which further comprises an elastic member holder attached to the lower surface of the gas cylinder of said gas spring section said elastic member holder holding said elastic member in a deformation space between said gas cylinder and said punch guide, the deformation space being formed between a lower end surface of said elastic member holder and the upper surface of said punch guide.

3. The punching tool of claim 2, wherein a mounting load of said elastic member is smaller than a mounting load of said gas spring section; and a spring constant of said elastic member is so determined such that an elastic force of said elastic member becomes substantially equal to a mounting load of said gas spring section after having been deformed by an amount substantially equal to the deformation space.

4. The punching tool of claim 2, wherein said elastic member holder has a U-shaped cross section.

5. The punching tool of claim 1, wherein the piston rod portion of said punch driver is formed with a large diameter portion projecting upward from an upper surface of the gas cylinder of said gas spring section and with a small diameter portion projecting downward from a lower surface of the gas cylinder, a punch head being attached to an upper surface of the large diameter portion, and said punch body being fixed to a lower surface of the small diameter portion via a punch key holder.

6. The punching tool of claim 1, wherein an outer diameter of the gas cylinder of said gas spring section is substantially equal to an outer diameter of said punch guide.

* * * * *

UNITED STATES PATENT AND TRADEMARK OFFICE

CERTIFICATE OF CORRECTION

PATENT NO. : 5,813,301

DATED : September 29, 1998

INVENTOR(S) : Oriya FUJITA

It is certified that error appears in the above-identified patent and that said Letters Patent is hereby corrected as shown below:

At column 8, line 25 (claim 2, line 3) of the printed patent, after "section", insert --,--.

Signed and Sealed this

Fourth Day of April, 2000

*Attest:*

Q. TODD DICKINSON

*Attesting Officer*

*Director of Patents and Trademarks*